B. G. MARTIN.
Carpenter's Rule.
No. 49,037. Patented July 25, 1865.
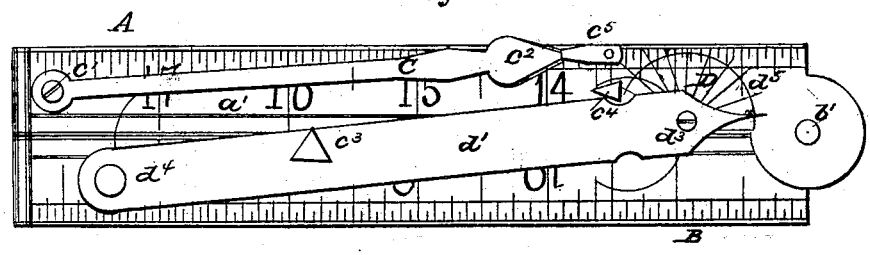
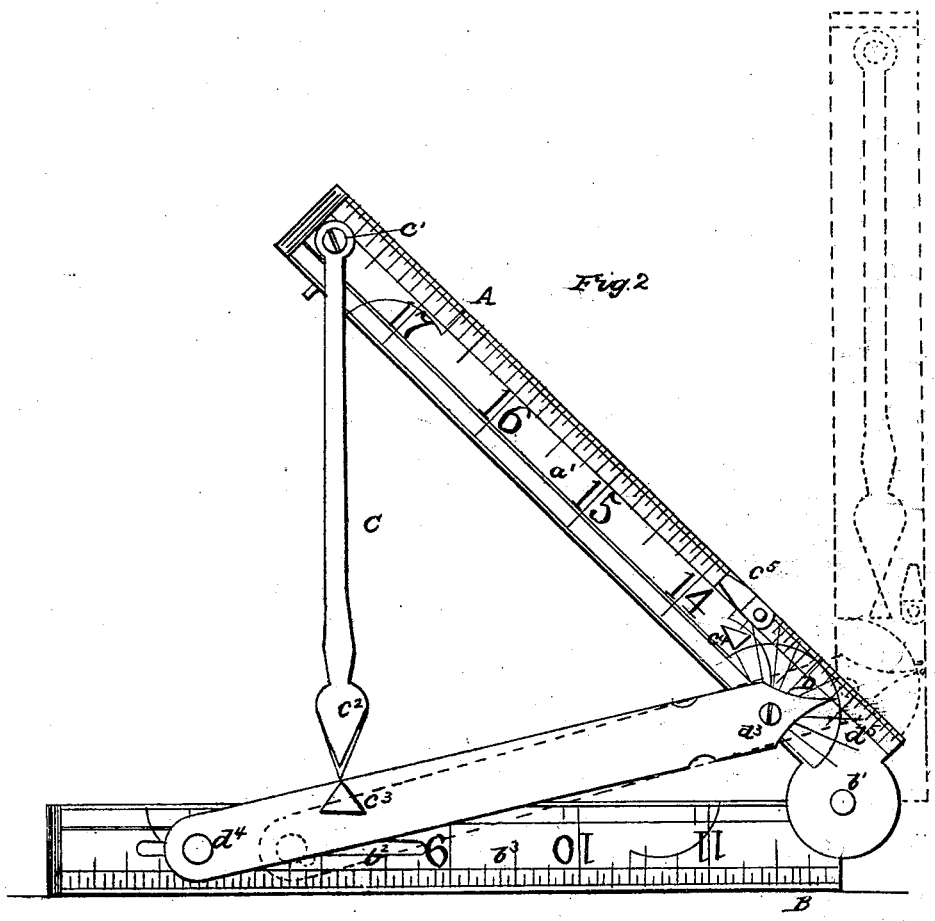
WITNESSES
Benj. Martin
Thomas M. Curis
INVENTOR
Benjamin Glenn Martin

UNITED STATES PATENT OFFICE.

BENJAMIN G. MARTIN, OF PHILADELPHIA, PA., ASSIGNOR TO HIMSELF, THOS. M. DAVIS, LLOYD H. WALTON, AND WATSON SANFORD.

IMPROVEMENT IN CARPENTERS' RULES.

Specification forming part of Letters Patent No. 49,037, dated July 25, 1865.

*To all whom it may concern:*

Be it known that I, BENJAMIN G. MARTIN, of the city of Philadelphia, in the State of Pennsylvania, have invented a new and useful Improvement in the Carpenter's Pocket-Rule; and I do hereby declare that the following is a full, clear, and exact description of the construction and operation of the same, reference being had to the accompanying drawings, making a part of this specification, in which—

Figure 1 represents one side of a two-foot rule folded in the usual six-inch length for the pocket, and having my said improvement applied thereto; and Fig. 2, the same improved rule as opened to an angle of forty-five degrees and supported on its edge as a plumb-level, like letters of reference indicating the same parts when in both figures.

The nature of my invention consists, first, in combining with the carpenter's pocket-rule a pointed swinging arm in such a manner as to adapt the rule to the purposes also of a plumb-level; and, second, in combining with the said rule an index and pointer in such a manner that any angle of inclination to a plane may be readily ascertained thereby, as well as a perpendicular to the said plane, thus adapting the well-known pocket-rule of the carpenter to answer also the useful purposes of a level and of a square and bevel, and without either impairing it as a pocket-rule or materially increasing its cost.

In the drawings, A B is the rule; C, the pointed swinging arm; D, the index, and $d'$ its pointer.

The rule A B is constructed in the usual well-known manner as a two-foot rule, having folding joints, so as to adapt it for being conveniently carried in the pocket in a six-inch length.

The arm C is made of metal, is about four inches long, and has one end secured, so that the arm will swing freely from a pivot-screw, $c'$, fixed at a point on the section $a'$ of the rule near one of the first folds of the same, its other end, $c^2$, being made wider or heavier and pointed at its extreme end, and is also left free to move.

The index-pointer $d'$ is also made of metal, is about five inches long, and has its index end pointed and secured by a pivot-screw, $d^3$, fixed at about seven eigths of an inch from the center of the main joint $b'$ of the rule A B, and close to the inner edge of the same section $a'$ of the rule which carries the arm C, while its other end is attached, by means of a double-headed screw, $d^4$, to a slot, $b^2$, which is cut longitudinally in the section $b^3$, of sufficient length to allow the two sections $a'$ and $b^3$ of the rule to close together, as shown in Fig. 1, and also to open out into a straight line with each other, as heretofore.

The index D consists of a curved line, $d^5$, on the face of the section $a'$ of the rule, and of a series of equidistant radial lines whose center of radiation is the pivot $d^3$, the first radial line being made to coincide with the point of the index-pointer $d'$ when the rule is closed, and is marked by a cipher, $o$. The next line from this indicates fifteen degrees of opening in the rule when the pointer coincides with it, and so on, the curve-line $d^5$ is divided into parts of fifteen degrees each, and consequently when the pointer $d'$ coincides with the fourth radial line the rule is open forty-five degrees, as seen in Fig. 2, and when the pointer coincides with the seventh radial line the rule is open to ninety degrees and forms the square, as indicated by the dotted lines in the same figure, the pointed block $c^4$ being the plumb-indicator. These radii may be more numerous and each one of them figured as those shown, if desired; but the number indicated in the drawings will generally be found sufficient.

On the index-pointer $d'$ a small pointed block, $c^3$, is fixed in a position that will make its upper point coincide with the point at the lower end of the swinging arm C when the rule is opened to forty-five degrees of the index D and held upright with its section $b^3$ on a horizontal plane, as shown in Fig. 2.

When the rule is closed, as in Fig. 1, the swinging arm C is fixed by means of a stay-piece, $c^5$, under which its point is passed.

It will be seen that when this improved rule is closed, as in Fig. 1, it can be slipped into the appropriate pocket and carried as conveniently therein as the old rule; that when opened to forty-five degrees and applied as seen in Fig. 2 it will serve the purpose of a level; that when opened to ninety degrees it will form both a square and a plumbing instrument, and that any angle between 0 and one hundred and eighty degrees can be measured by it with accuracy, it forming an indexed bevel.

The construction of the devices shown is simple, and they can be applied to any of the said pocket-rules now in use by carpenters and others and at a trifling cost, and will afford greatly increased facilities in their mechanical operations.

I wish it to be understood that I do not intend to confine myself to the precise forms and dimensions shown; but, Having fully described my improved rule and shown its utility, what I claim as new therein of my invention, and desire to secure by Letters Patent, is—

1. The swinging arm C, in combination with a pocket-rule, A B, the same being arranged to operate together substantially as described, for the purposes specified.

2. The index D and pointer $d'$, in combination with a pocket-rule, A B, the same being arranged to operate together substantially as described, for the purposes specified.

BENJAMIN GREEN MARTIN.

Witnesses:
 BENJ. MORISON,
 THOMAS M. REVIS.